US010029722B1

United States Patent
Springwater

(10) Patent No.: US 10,029,722 B1
(45) Date of Patent: *Jul. 24, 2018

(54) TRANSPORT DEVICE

(71) Applicant: Gary Springwater, Rogers, AR (US)

(72) Inventor: Gary Springwater, Rogers, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/047,268

(22) Filed: Feb. 18, 2016

Related U.S. Application Data

(63) Continuation-in-part of application No. 14/309,172, filed on Jun. 19, 2014, now Pat. No. 9,296,408, which is a continuation-in-part of application No. 13/650,094, filed on Oct. 11, 2012.

(60) Provisional application No. 61/627,394, filed on Oct. 11, 2011.

(51) Int. Cl.
*B62B 15/00* (2006.01)
*B62B 17/06* (2006.01)
*B62B 3/00* (2006.01)

(52) U.S. Cl.
CPC ............ *B62B 15/009* (2013.01); *B62B 3/002* (2013.01); *B62B 15/007* (2013.01); *B62B 17/06* (2013.01); *B62B 2202/50* (2013.01); *B62B 2202/52* (2013.01)

(58) Field of Classification Search
CPC ........... B62B 1/18; B62B 17/06; B62B 3/002; B62B 13/00; B62B 13/06; B62B 13/18; B62B 15/00; B62B 15/007; B62B 15/008; B62B 15/009; B62B 2202/50; B62B 2202/52

See application file for complete search history.

(56) References Cited

U.S. PATENT DOCUMENTS

| | | | |
|---|---|---|---|
| 487,990 A | 12/1892 | Chittick | |
| 1,162,473 A | 11/1915 | Gedge | |
| 1,357,117 A | 10/1920 | Rhodes | |
| 1,443,655 A | 1/1923 | Shaffer | |
| 1,501,271 A | 7/1924 | Colson | |
| 1,524,563 A | 1/1925 | Lang | |
| 1,585,575 A | 5/1926 | Van Husan | |
| 1,922,808 A | 8/1933 | Hile | 217/125 |
| 2,170,283 A | 8/1939 | Williams et al. | 229/6 |
| 2,433,246 A | 12/1947 | Stelzer | 280/8 |

(Continued)

FOREIGN PATENT DOCUMENTS

| | | | | |
|---|---|---|---|---|
| EP | 373502 A2 | 6/1990 | | B62B 15/00 |
| GB | 2328182 A | * | 2/1999 | B62B 1/18 |

OTHER PUBLICATIONS

BJs.com internet catalog listing for Pelican Snow Trek 45 utility sled, dated Jan. 3, 2011.

*Primary Examiner* — James A Shriver, II
*Assistant Examiner* — Steve Clemmons
(74) *Attorney, Agent, or Firm* — Keisling & Pieper PLC; David B. Pieper

(57) ABSTRACT

The transport device provides a front wall, rear wall, two side walls, and a bed for storage of transported contents. Handle apertures located within the side walls and rear wall are strategically placed to allow the user to manipulate the transport device. The handle apertures enable users to easily position and manipulate the transport device for transporting items and use as a scoop. Storage recesses are found on the rear wall and side walls on the transport device. The elevated storage recesses allow storage above items transported on the bed of the transport device.

4 Claims, 17 Drawing Sheets

(56) References Cited

U.S. PATENT DOCUMENTS

| | | | |
|---|---|---|---|
| 2,493,315 A | 1/1950 | Ruka | 280/12 |
| 2,538,599 A | 1/1951 | Swanson | 280/19 |
| 2,614,857 A | 10/1952 | Mathisen | 280/8 |
| 3,169,779 A | 2/1965 | Haab | 280/18 |
| D201,815 S | 8/1965 | Greenberg | 34/15 |
| 3,266,813 A | 8/1966 | Bosko et al. | 280/8 |
| 3,380,090 A | 4/1968 | Kenmuir | 9/6 |
| 3,414,284 A | 12/1968 | Rosekrans, Jr. et al. | 280/21 |
| 3,670,938 A | 6/1972 | Brocato | 224/48 |
| 3,937,482 A | 2/1976 | Johnson | 280/18 |
| 4,173,351 A | 11/1979 | Hetland | 280/19 |
| 4,666,171 A | 5/1987 | Sellers | 280/18 |
| D320,682 S | 10/1991 | Braswell | 34/18 |
| 5,104,133 A | 4/1992 | Reiner | 280/19 |
| 5,211,434 A | 5/1993 | Lanava | 294/1.1 |
| 5,318,315 A | 6/1994 | White et al. | 280/47.26 |
| 5,370,263 A | 12/1994 | Brown | 220/751 |
| D356,981 S | 4/1995 | Bennett | 12/11 |
| 5,575,490 A | 11/1996 | Simpson, Jr. | 280/28.12 |
| 5,620,191 A | 4/1997 | Sayette | 280/13 |
| 5,653,455 A | 8/1997 | Richards | 280/19 |
| 5,897,121 A | 4/1999 | Case | 279/145 |
| 5,897,131 A * | 4/1999 | Brown | B62B 1/12 |
| | | | 280/28.12 |
| 5,911,422 A | 6/1999 | Carpenter et al. | 280/8 |
| 6,474,097 B2 | 11/2002 | Treppedi et al. | 62/457.7 |
| 6,520,513 B2 | 2/2003 | Presley-Mays | 280/32.5 |
| 6,533,298 B2 | 3/2003 | Sims | 280/47.26 |
| 6,622,425 B2 | 9/2003 | Shepherd | 47/17 |
| 6,823,998 B2 | 11/2004 | Fabregas | 211/70.6 |
| 7,290,651 B2 | 11/2007 | Irwin et al. | 206/216 |
| 7,306,243 B2 * | 12/2007 | Van Horn | A45C 7/0022 |
| | | | 280/30 |
| 7,392,992 B2 | 7/2008 | Stone et al. | 280/33.992 |
| 7,494,136 B2 | 2/2009 | Alves et al. | 280/33.998 |
| 7,699,324 B2 | 4/2010 | Walkingshaw et al. | 280/18.1 |
| 7,959,182 B2 * | 6/2011 | Klein | A01K 97/01 |
| | | | 280/47.18 |
| 9,296,408 B1 * | 3/2016 | Springwater | B62B 15/00 |
| 2002/0153680 A1 | 10/2002 | Moore | 280/20 |
| 2003/0067128 A1 | 4/2003 | Fireman et al. | 280/19 |
| 2004/0055979 A1 | 3/2004 | Fabregas | 211/70.6 |
| 2004/0119252 A1 | 6/2004 | Sellers | 280/18 |
| 2005/0218611 A1 | 10/2005 | Mehrmann | 280/18 |
| 2006/0181038 A1 | 8/2006 | Walter | 280/19.1 |
| 2006/0255552 A1 | 11/2006 | Wojnowski et al. | 280/18 |
| 2007/0068757 A1 * | 3/2007 | Tan | A45C 5/143 |
| | | | 190/18 A |
| 2007/0138752 A1 | 6/2007 | Kress et al. | 280/19 |
| 2007/0164526 A1 | 7/2007 | Martini et al. | 280/47.26 |
| 2007/0278754 A1 | 12/2007 | Walkingshaw et al. | 280/18 |
| 2008/0083636 A1 | 4/2008 | Devine | 206/423 |
| 2008/0135556 A1 | 6/2008 | Bontrager et al. | 220/260 |
| 2009/0057305 A1 | 3/2009 | Moreau | 220/4.27 |
| 2009/0146387 A1 | 6/2009 | Klein | 280/30 |
| 2009/0152158 A1 | 6/2009 | Kidd et al. | 206/564 |
| 2010/0000900 A1 | 1/2010 | Hassell | 206/509 |
| 2011/0025004 A1 | 2/2011 | Walkingshaw | 280/19 |
| 2011/0037237 A1 | 2/2011 | Hassell | 280/79.11 |
| 2012/0132558 A1 | 5/2012 | Busch | 206/503 |

\* cited by examiner

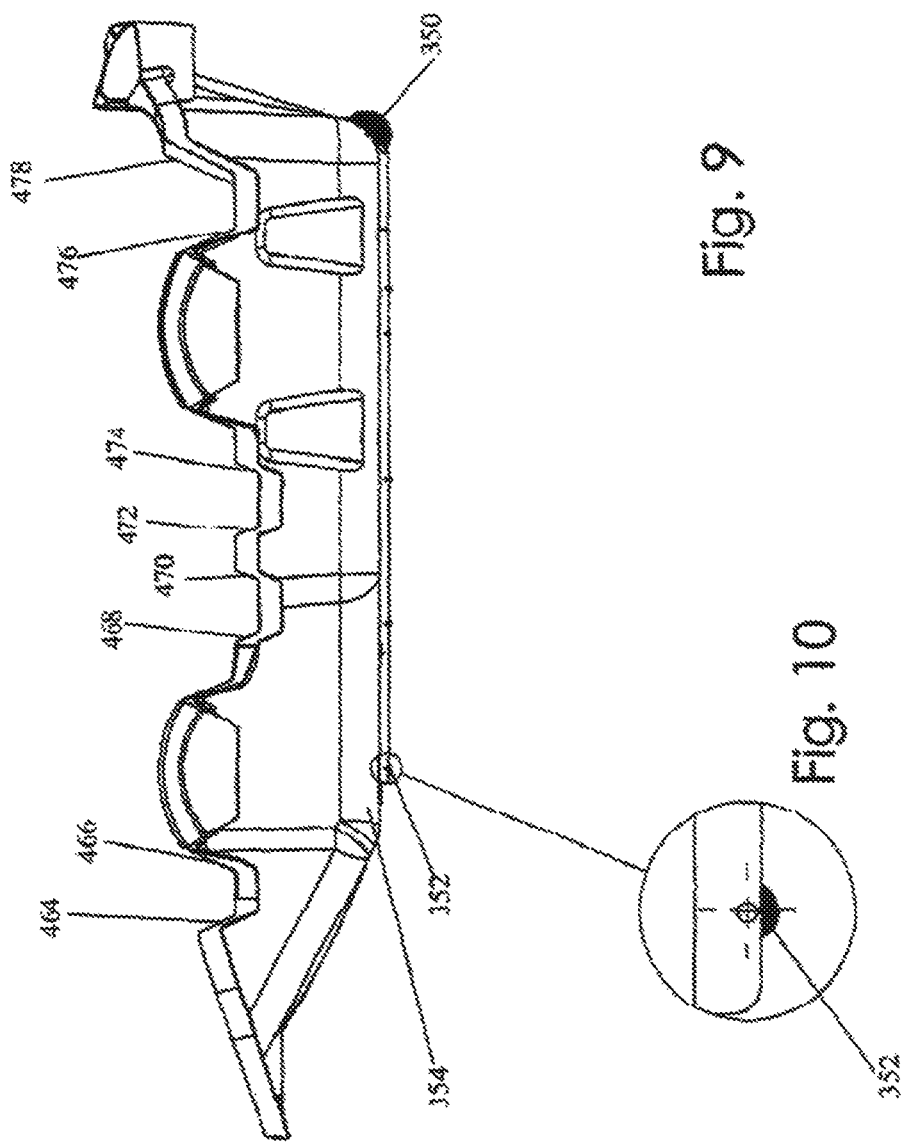

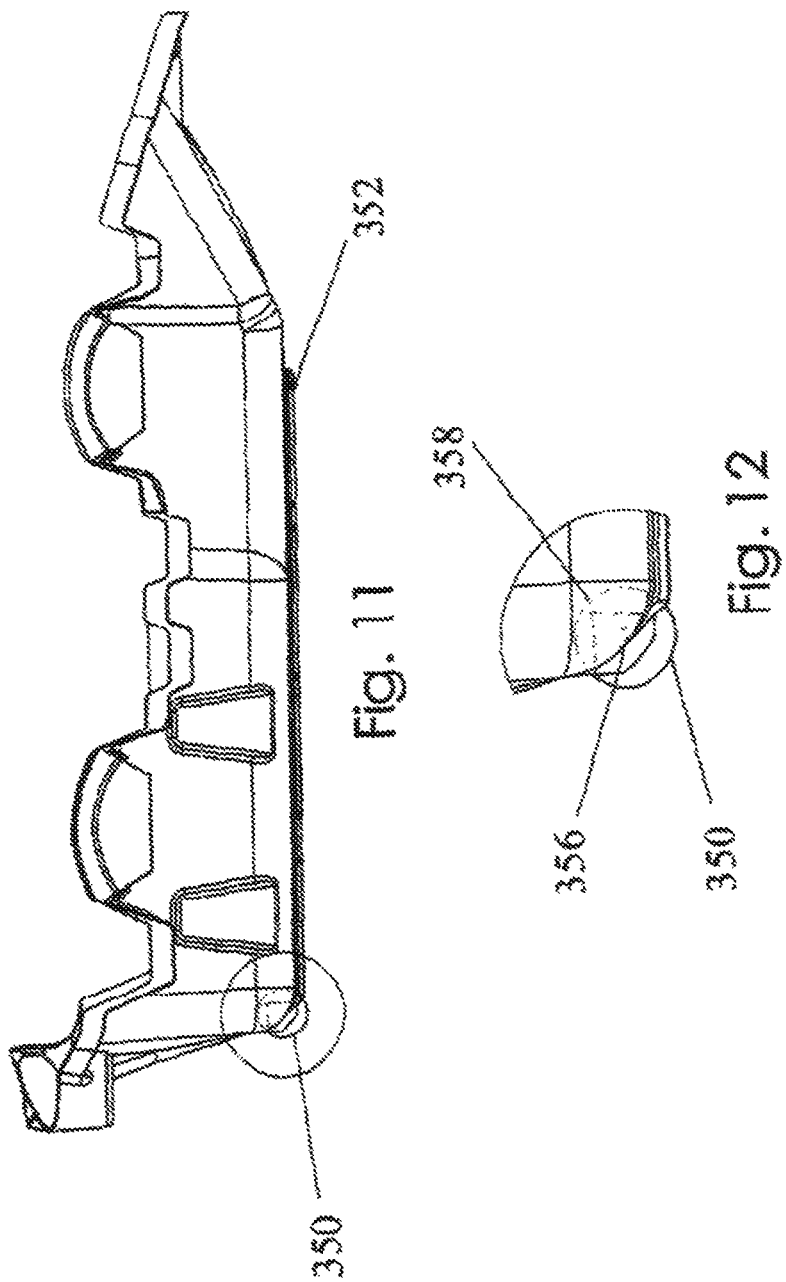

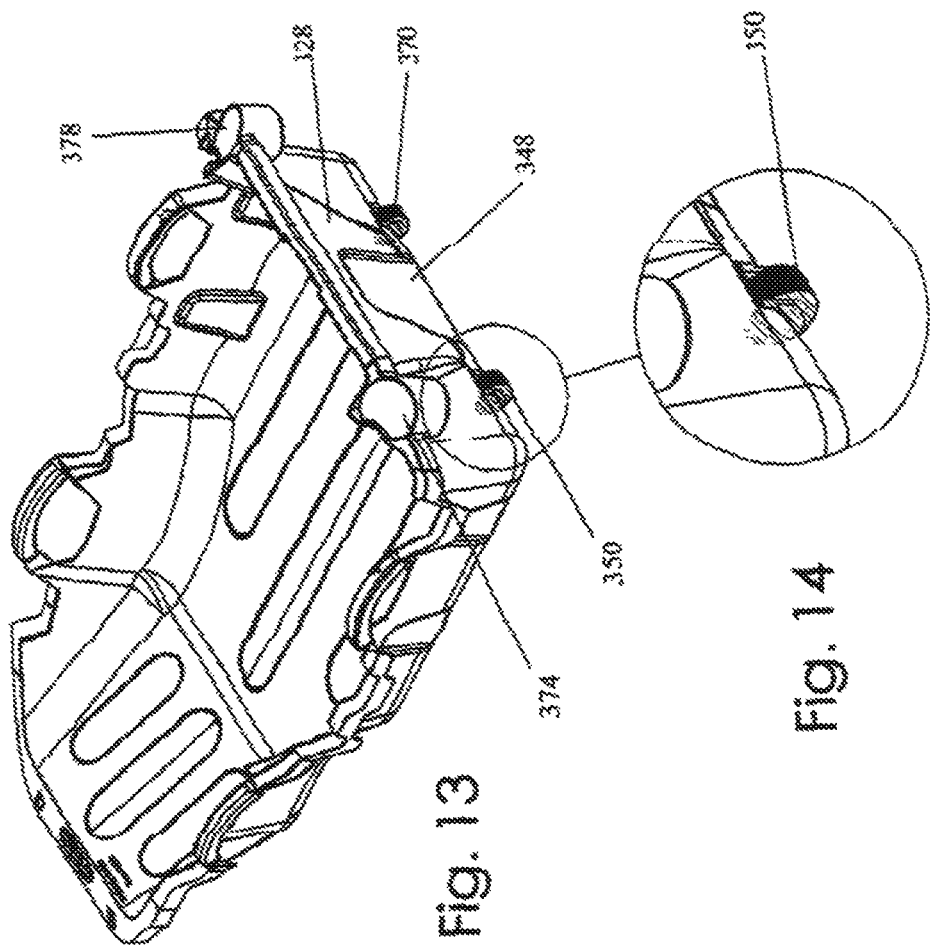

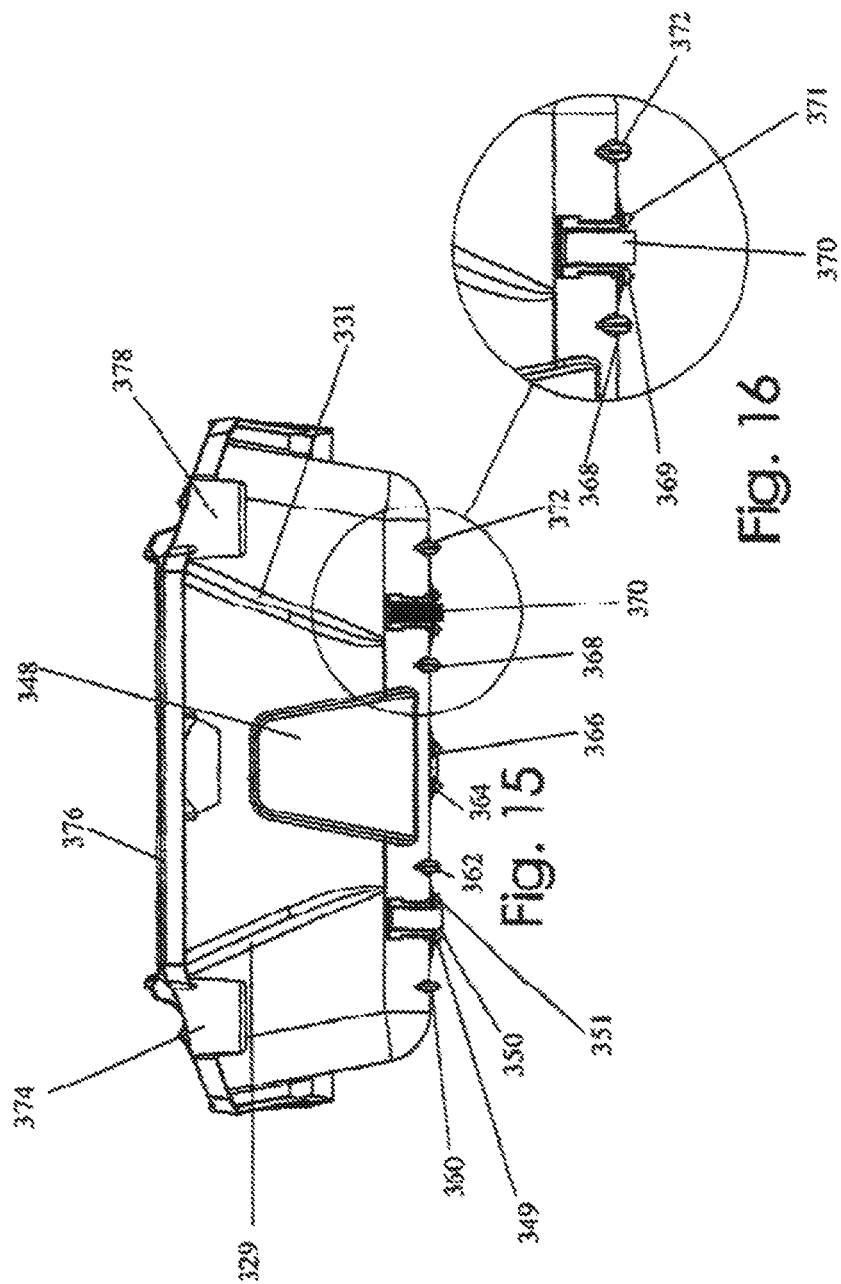

TRANSPORT DEVICE

CROSS-REFERENCE TO RELATED APPLICATIONS

This application claims priority to and is a continuation-in-part of U.S. patent application Ser. No. 14/309,172, filed on Jun. 19, 2014 entitled TRANSPORT DEVICE, which is a continuation in part of U.S. patent application Ser. No. 13/650,094, filed on Oct. 11, 2012, which was a continuation in part of U.S. provisional application No. 61/627,394 filed on Oct. 11, 2011, all of which are hereby incorporated in reference in their entirety.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such us but not limited to copyright, trademark, and/or trade dress protection. The owner has no objection to the facsimile reproduction by anyone at the patent document or the patent disclosure as it appears in the Patent and Trademark Office patent files or records but otherwise reserves all rights whatsoever.

BACKGROUND OF THE INVENTION

I. Field of the Invention

The present invention is related to a transport device designed for the lawn, garden, yard, beach, and other locations, including interior locations. The transport device provides a front wall, rear wall, and two side walls. The transport device also provides a bed for storage of transported contents.

II. Description of the Known Art

Lawn litter such as leaves, grass clippings, papers, twigs, and other debris may be raked into a pile. The person will then either bag the debris or place the debris in a wheel barrow. This method of transporting lawn litter has the disadvantage of being difficult to place within the bag or the wheelbarrow.

The bags and plastic bags can be difficult to fill causing the person to spill or otherwise drop the debris. Furthermore, the user must carry the contents, a task that may require physical strength. Bags cannot usually be dragged due to the bag ripping and spilling the contents.

Other devices such as wagons and wheelbarrows eliminate carrying the contents. However, wagons and wheelbarrows require a considerable economic investment by the user, and are bulky to store. Furthermore, the bags and wheelbarrows are not designed to assist with securing tools or other equipment.

Patents and patent applications disclosing information relevant to the present invention are disclosed below including U.S. Pat. No. D356,981. These patents and patent applications are hereby expressly incorporated by reference in their entirety.

U.S. Pat. No. 4,173,351 issued to Hetland on Nov. 6, 1979 ("the '351 patent) teaches a lawn litter sled for the purpose of hauling leaves, grass clippings, papers, twigs and other such matter. A precut, corrugated cardboard taught by the '351 patent may be assembled into a rectangular, or other geometric form, sled that when filled with lawn litter may be easily dragged along the ground. The said apparatus taught by the '351 patent has a folding loading panel which, when in a horizontal position, enables the user to sweep lawn litter into the said sled, then by positioning the loading panel into a vertical position and by pulling on a provided rope, the loading panel may be secured in a vertical position by frictional forces the loading panel is attached to side panels through which fold and hold the loading panel upright to secure the contents of the sled.

U.S. Patent No. 5,104,133 issued to Reiner on Apr. 14, 1992 ("the '133 patent") teaches a hauling device for leaves, litter, and other materials such as stone, earth, mulch, manure and tree stumps that comprises a tarpaulin with flexible support members and a rope including a unique assembly whereby the operator may secure and haul the collected material by pulling a loop of the rope. The tarpaulin taught by the '133 patent is fitted with flexible support members within hems along the rear side edge and along a portion of each side edge. The rope ends taught by the '133 patent are attached to the tarpaulin at both sides and threaded through the apertures of hardware located at both front and rear corners, thus providing a loop along the front side to be grasped either by the operator or a mechanical device such as a tractor. Once material is collected on the surface of the tarpaulin, the operator of the invention taught by the '133 patent pulls the loop and thereby harnesses the rear and side edges, flexes the support members, and in unison confines the collected material. As the operator continues to pull the loop, obstructions on the rope arrest the confining action to provide a towline for the operator to haul the device along the ground to another location. To unload the material, the '133 patent teaches that the operator releases the loop and grasps the device along the rear side and rolls out the material over the front side. After the device taught by the '133 patent is free of material, the operator gives the device a shake which retracts the rope and provides the device in a flat state to position for another load of material.

U.S. Pat. No. 5,211,434 issued to Lanava on May 18, 1993 ("the '434 patent") teaches a slidable utility carrier which has a rectangular bottom panel and four rectangular side panels which form a rectangular box-like structure having an open top. Each side panel taught by the '434 patent is hinged to the bottom panel and is secured to the adjacent side panel by removable fasteners. The carrier taught by the '434 patent can be collapsed to a fully opened state in which all of the panels lay in the same plane and extend outwardly from the bottom panel for collecting loose particulate material or to a compact state in which the side panels overlie the bottom panel to form a compact package for storing.

SUMMARY OF THE INVENTION

The transport device provides a front wall, rear wall, and two side walls. The transport device also provides a bed for storage of transported contents, such as leaves, plants, flats of flowers, dirt, trees, mulch, flowers, shrubs, chairs, lawn chairs, garden tools, ice chests, coolers, and other equipment and devices. The transport device can be used outdoors in the yard, garden, beach, snow, other outdoor locations, or indoors. The device can be loaded with items to be transported over multiple terrains. The transport device also improves the ability to work on uneven surfaces and multiple types of surface with loads. The transport device also improves the ability to transport a load across uneven surfaces and multiple types of surfaces.

Handles are strategically placed at the side walls, front wall, and rear wall. The handle apertures enable users to easily position and manipulate the transport device.

Storage recesses found on the rear wall and side walls secure a device, tool, shovels, flats of flowers, rakes, hoes, and other equipment on the transport device. The storage recesses direct the items on to the walls to maintain the items on the transport device. The elevated storage recesses allow storage of equipment, flats, and other items above items transported on the bed of the transport device.

The present invention may also be used as a scoop. The user positions the transport device on its side for placement of leaves, dirt, debris, or other items to be transported on the transport device.

The present invention simplifies the process of transporting items, contents, equipment, chairs, plants, flowers, and other items.

The present invention provides multiple handle apertures for positioning the transport device as a scoop.

The present invention provides handle apertures towards the front of the transport device to enable the user to lift the front of the transport device upwards to use the transport device as a dolly.

One embodiment of the present invention provides a transport device that does not use wheels to reduce costs and increase the maneuverability of the transport device.

The present invention also provides a stackable design to decrease the storage space and reduce shipping costs.

These and other objects of the invention will become more fully apparent as the description proceeds in the following specification and the attached drawings. These and other objects and advantages of the present invention, along with features of novelty appurtenant thereto, will appear or become apparent in the course of the following descriptive sections.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views:

FIG. 9 is a right side view thereof;

FIG. 10 is a view of a portion of one embodiment of the present invention;

FIG. 11 is a partial left side view of one embodiment of the present invention;

FIG. 12 is a view of a portion of one embodiment of the present invention;

FIG. 13 is a top perspective view of one embodiment of the present invention;

FIG. 14 is a view of a portion of one embodiment of the present invention;

FIG. 15 is a rear view of one embodiment of the present invention;

FIG. 16 is a view of a portion of one embodiment of the present invention;

DETAILED DESCRIPTION OF THE INVENTION

The transport device is constructed from a semi-rigid to rigid material. The present invention may be constructed from polypropylene, plastic, and other materials. The transport device assists transportation of items, devices, and other materials without the use of a wheeled device. The transport device 100 of the present invention generally shown as a sled dolly 100.

Figure 1:
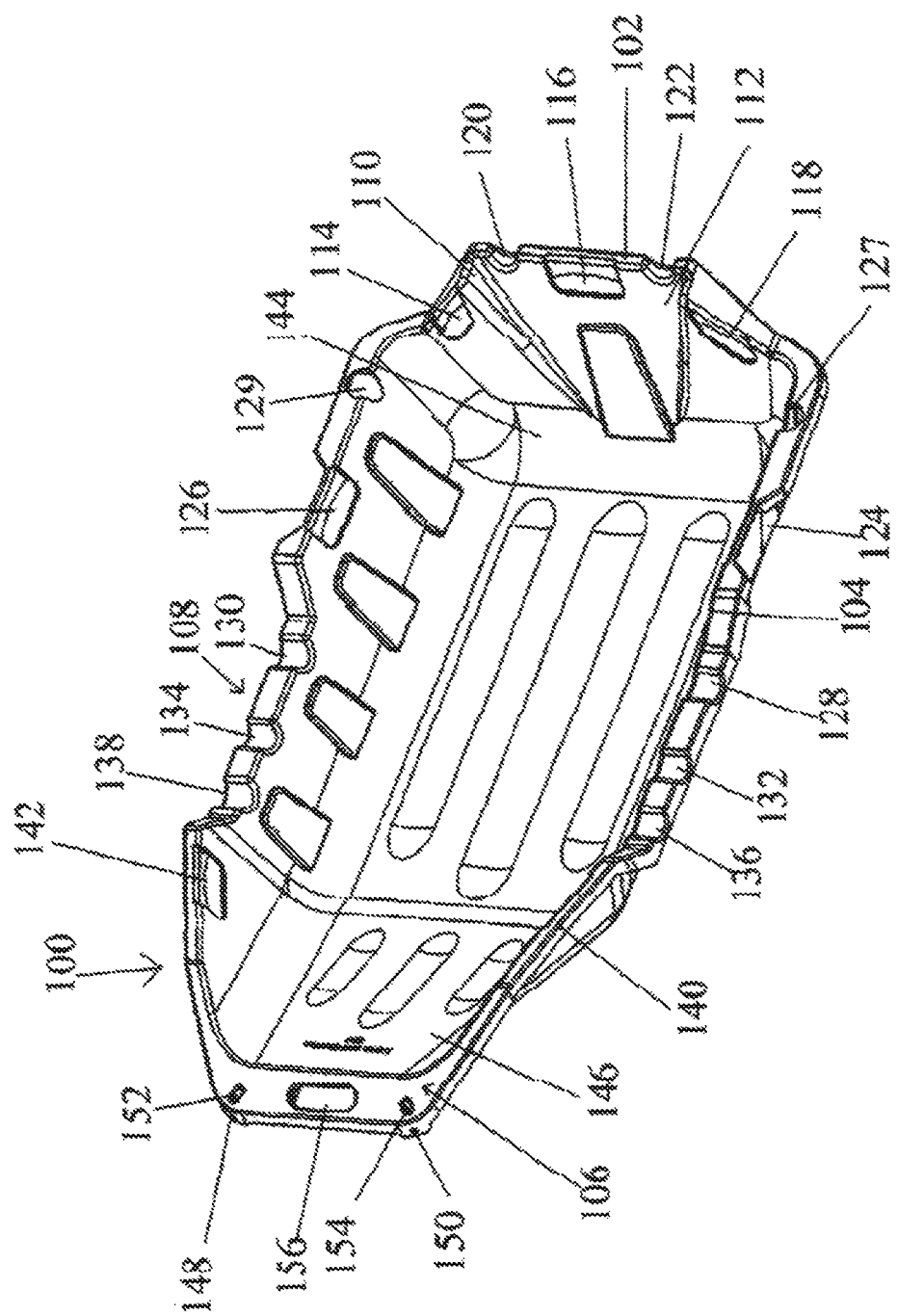
FIG. 1 is a top perspective view showing one embodiment of the present invention.
Figure 2:
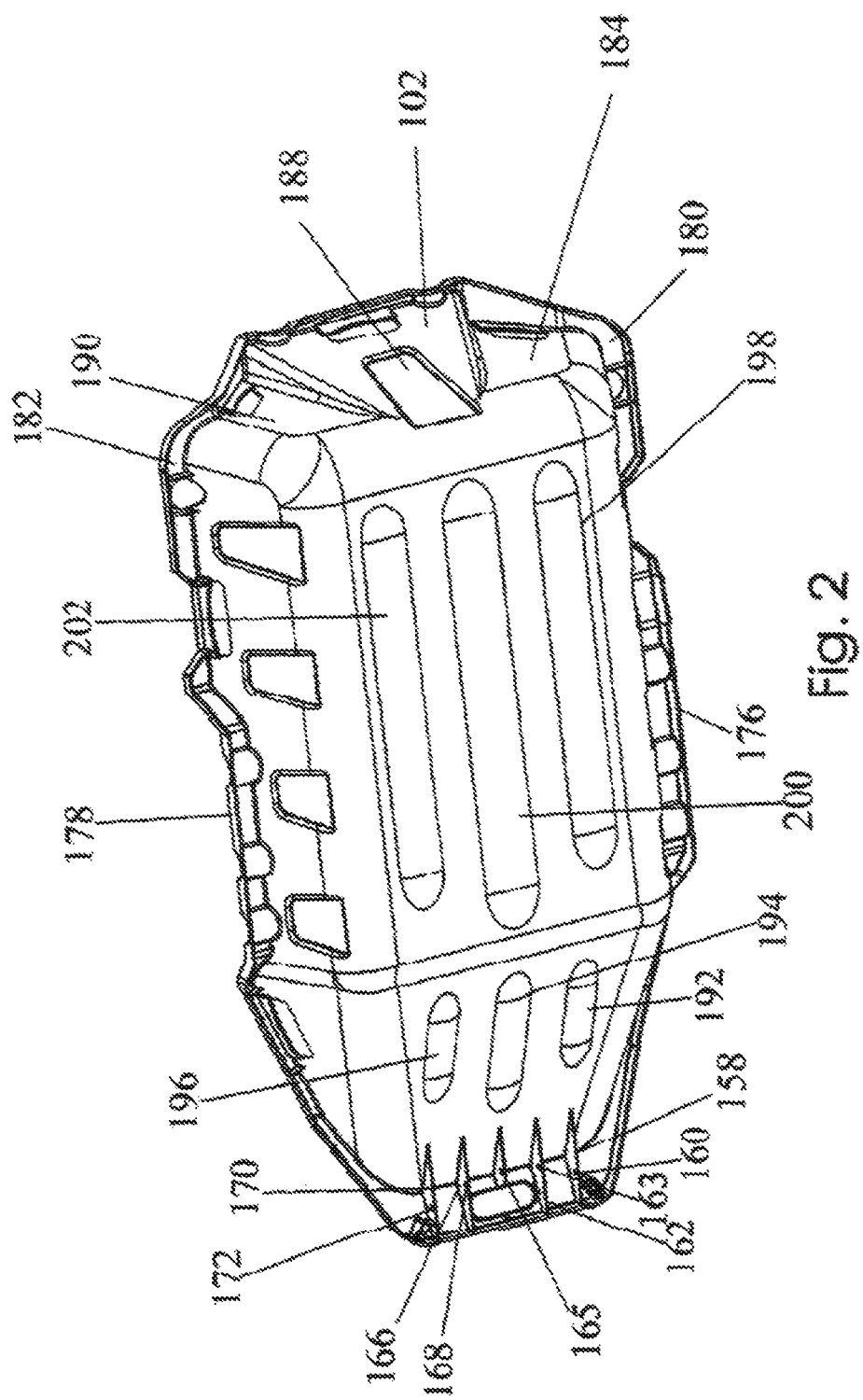
FIG. 2 is a bottom perspective view thereof.

FIGS. 1 and 2 show two perspective views of one embodiment of the transport device. Items such as grass clippings, leaves, mulch, fertilizer, gravel, rocks, plants, trees, shrubs, flowers, flats of flowers, tools, equipment, yard debris, and other items may be carried upon the transport device 100. The transport device 100 provides a front wall 106, a right side wall 104, a left side wall 108, and a rear wall 102. Items may be stored on the bed 144 of the transport device 100. The front wall 106, the right side wail 104, the left side wall 108, and the rear wall 102 extend upward from the bed 144 to maintain items on the bed 144 of the transport device.

Figure 5:
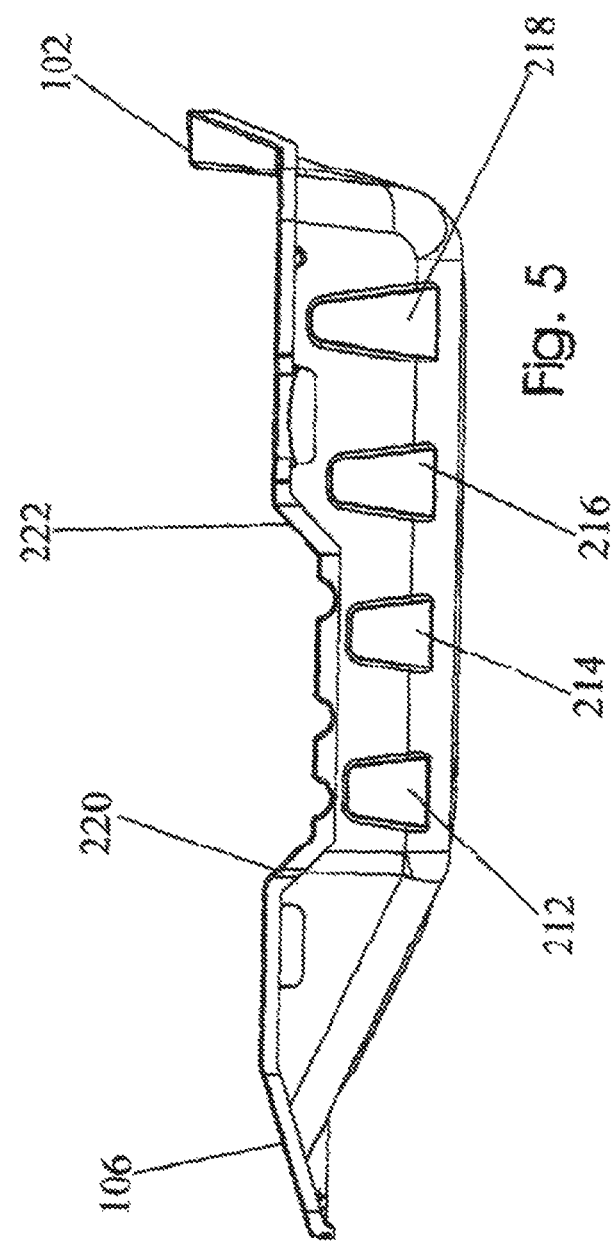
FIG. 5 is a right side view thereof, the left side view being a mirror image of the right side view.
Figure 6:
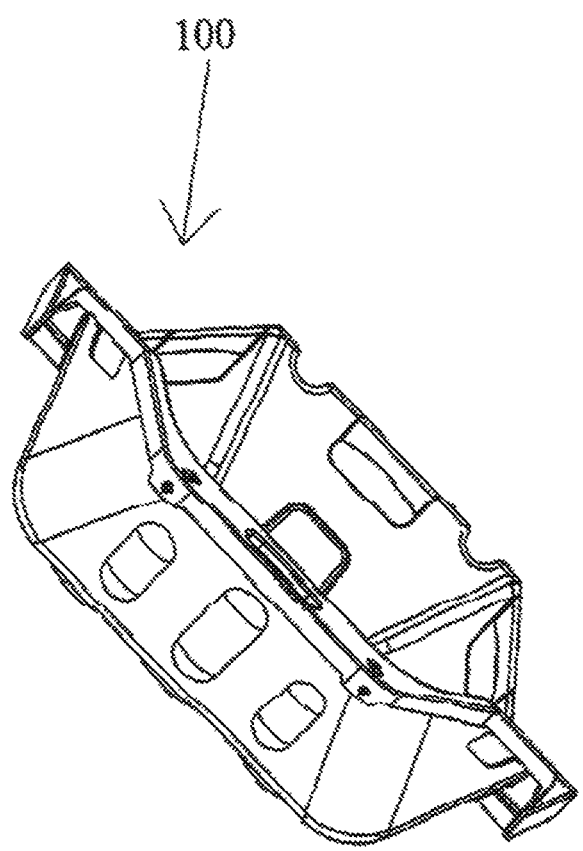
FIG. 6 is a front view of one embodiment of the present invention.
Figure 8:
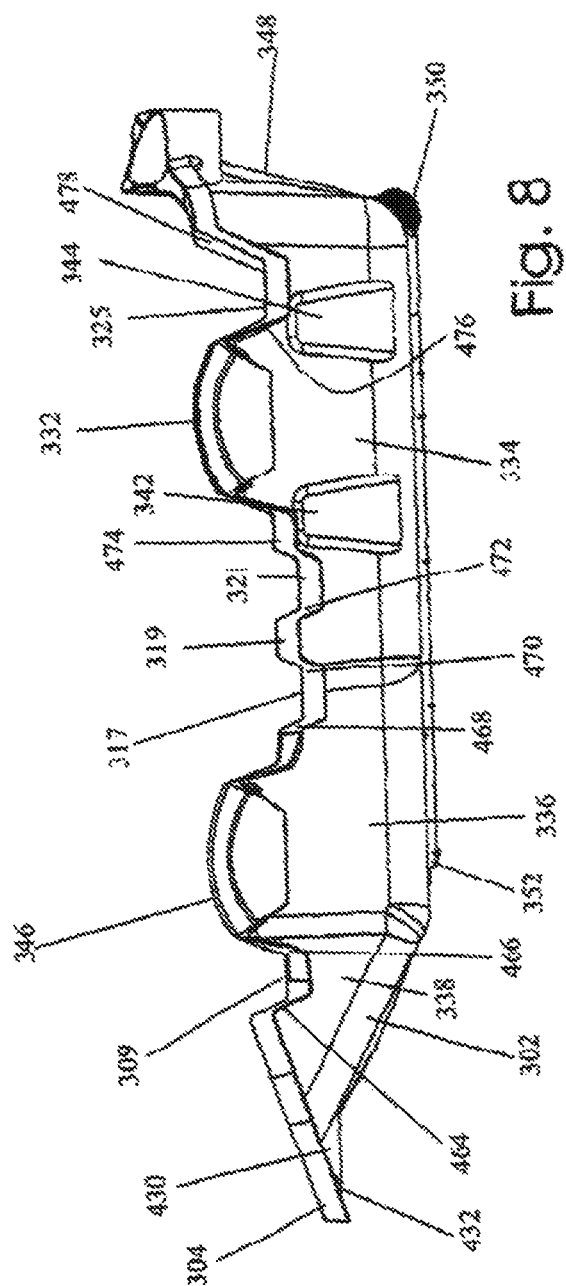
FIG. 8 is a right side view thereof; the left side view being a mirror image of the right side view.

Handle apertures 114, 116, 118, 124, 126, 140, 142, 156 enable the user to transport the transport device. The handle apertures 114, 116, 118, 124, 126, 140, 142, 156 are positioned at the front, the front sides, the rear, and the rear sides. The positioning of the handle apertures 114, 116, 118, 124, 126, 140, 142, 156 allow greater control and maneuverability of the transport device. A user may lift one side of the transport device 100 with the side handle apertures 126, 142, 124, 140 to form a scoop for placing items onto the bed 144 as shown in FIG. 6. The user could also lift the transport device higher on its side. The handle apertures are sized and positioned to allow for two by four pieces of wood to be inserted through the handle apertures and from one side wall to another for forming a raised surface above the bed 340 of the transport device 100. This can create a workstation for support of things like a potted plant so that dirt spilled when working on the plant falls into the sled and is caught. As shown in FIGS. 5, 8 and 9, the back side handle apertures 124, 126 and the front side handle apertures 140, 142 are equally positioned above the bed 340 to allow for a parallel surface to be made above the bed when the two by fours are inserted through the side handle apertures.

The handle apertures 114, 116, 118, 124, 126, 140, 142, 156 can also be used to lift the transport device 100. The front handles 140, 142, 156 and rear handles 114, 116, 118 enable two users to carry the transport device with one user positioned in the front and the second user positioned in the rear. Users can also lift the transport device 100 from the sides by using side handles 126, 142 and side handles 124, 140.

The handle apertures 124, 126 may also be used for placement of tools. The handle apertures 126 can include formed pockets of sized holes or inserting additional tools, string trimmer line, twine, or other items. The tools may be secured within handle apertures 124, 126 to limit movement of the tools while transporting the tools.

Storages recesses positioned throughout the transport device 100 store items and/or other equipment on the walls. Users can store items and equipment within storage recesses 127, 129, 128, 130, 132, 134, 136, 138. The user places items and equipment across the left side wall 108 and right side wall 104. The items and equipment may be placed within storage recesses 127, 129, 128, 130, 132, 134, 136, 138 to maintain the items and equipment on the transport device 100. Storage recesses 127, 129, 128, 130, 132, 134, 136, 138 are placed at the top of the left side wall 108 and right side wall 104 to elevate the storage recesses 127, 129, 128, 130, 132, 134, 136, 138 above the bed 144. Therefore, items and equipment stored within storage recesses 127, 129, 128, 130, 132, 134, 136, 138 are located above the bed and allow other items and equipment to be stored on the bed 144. In one embodiment, side walls 104, 108 are spaced at a distance to allow a flat of flowers to be placed on lips 176, 178.

The present invention also provides flat areas on side walls 104, 108 between storage recesses 130, 134, between storage recesses 134, 138, between storage recesses 128, 132, and between storage recesses 132, 136. These flat areas may be used as a work station or work table. These flat areas may also be used for placement of accessory parts of the transport device 100.

Storage recesses 120, 122 formed as curved arc apertures located on the rear wall 102 allow items and equipment to be stored on the front and back of the transport device 100. The storage recesses 120, 122 provide an area for placement of longer tools on the rear wall 102 for storage on transport device 100. The longer tools are positioned such that a portion of the tool such as the handle of a shovel is situated in storage recess 120, 122. The rear wall 102 is elevated higher than the front wall 106 for storage of items and equipment above the bed 144 and so that items can be carried level when the front wall 106 is elevated and the wheels 350, 352 are used to move the transport device 100.

FIG. 2 also shows bottom supports 198, 200, 202 which curve downwards to raise the bed 144 off the ground. The bottom supports 198, 200, 202 also increase the storage capacity of transport device 100 by curving downwards. The bottom supports 198, 200, 202 also provide horizontal support of the bed 144 to maintain the shape of the transport device 100. Front supports 192, 194, 196 support the front wall 106 to increase the rigidity of front wall 106 and maintain the shape of the front wall 106. The front supports 192, 194, 196 also curve downwards to increase storage capacity within the transport device 100.

The downward curvature of supports 192, 194, 196, 198, 200, 202 also improves a user's access to the contents within transport device 100. By not extending upwards, supports 192, 194, 196, 198, 200, 202 do not interfere with a user shoveling or otherwise emptying contents from the bed.

The user can lift or drag the transport device 100 by using front handle aperture 156. The user can also use a rope, webbing, cord, line, chain, or other device or material that can tow the transport device 100. The webbing installs onto the transport device 100 at towing recesses 152, 154. In one embodiment, the webbing may be tied at towing recesses 152, 154 to install the webbing. Ribs 158, 162, 166, 170 provide additional support to the front of the transport device. The webbing may pass through tow apertures 160, 163, 165, 168, 172 found in ribs 158, 162, 166, 170. The user can then tow the front of the transport device while applying even pressure to the front of the transport device 100.

FIG. 2 also shows the front lip 174, side lips 176, 178, and rear lips 180, 182. Lips 174, 176, 178, 180, 182 provide additional support to the upper portion of the walls. The lips 174, 176, 178, 180, 182 also provide additional surface area for placement of equipment, tools, and other items.

Figure 3:
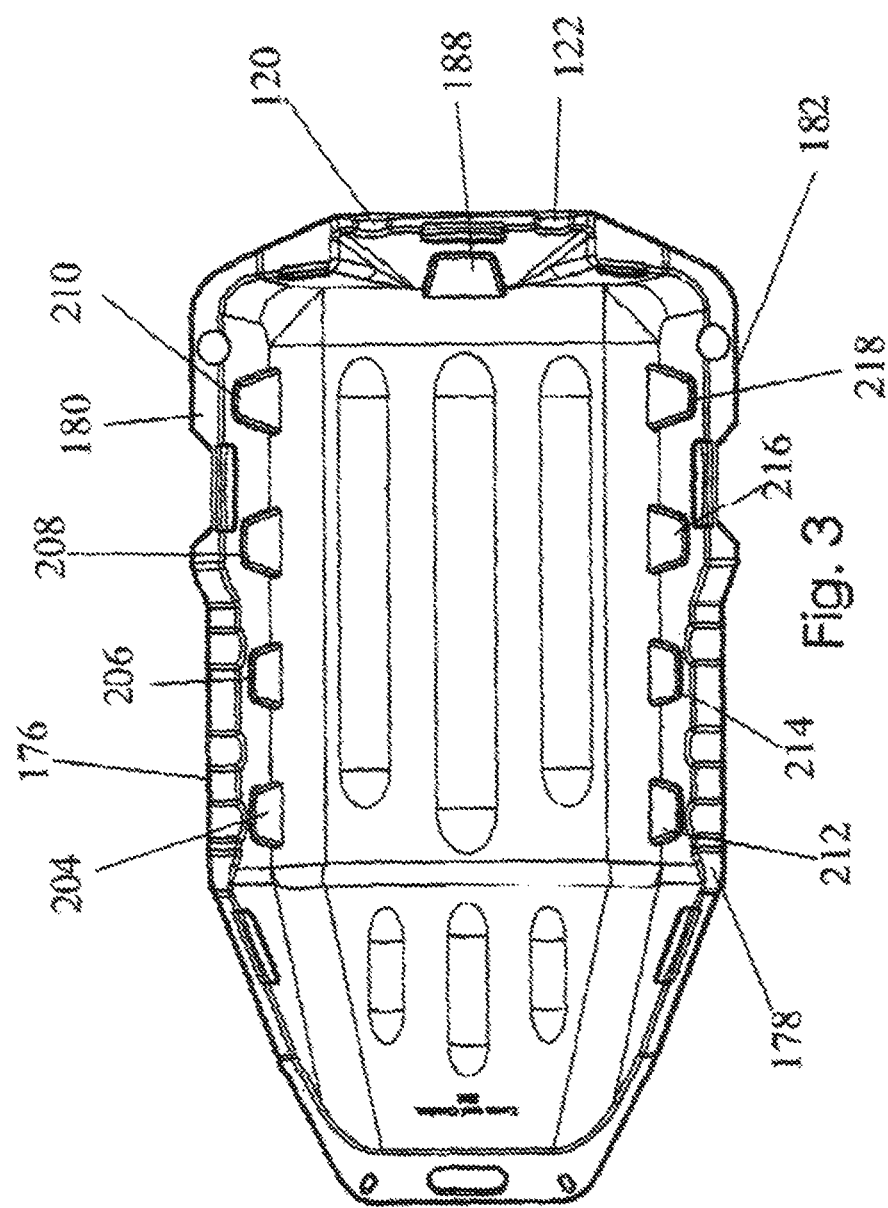
FIG. 3 is a top view thereof.

FIG. 3 shows a top view of the transport device 100. Side supports 204, 206, 208, 210, 212, 214, 216, 218 extend vertically upwards. The side supports 204, 206, 208, 210, 212, 214, 216, 218 provide additional support to the side walls 104, 108. The length of one embodiment of the transport device 100 from front to back ranges from 38 to 54 inches, preferably approximately 45 to 48 inches. The width of one embodiment ranges from 22 to 34 inches, preferably approximately 26 to 30 inches. The lips of the invention can range from one quarter of an inch to one inch.

Figure 4:
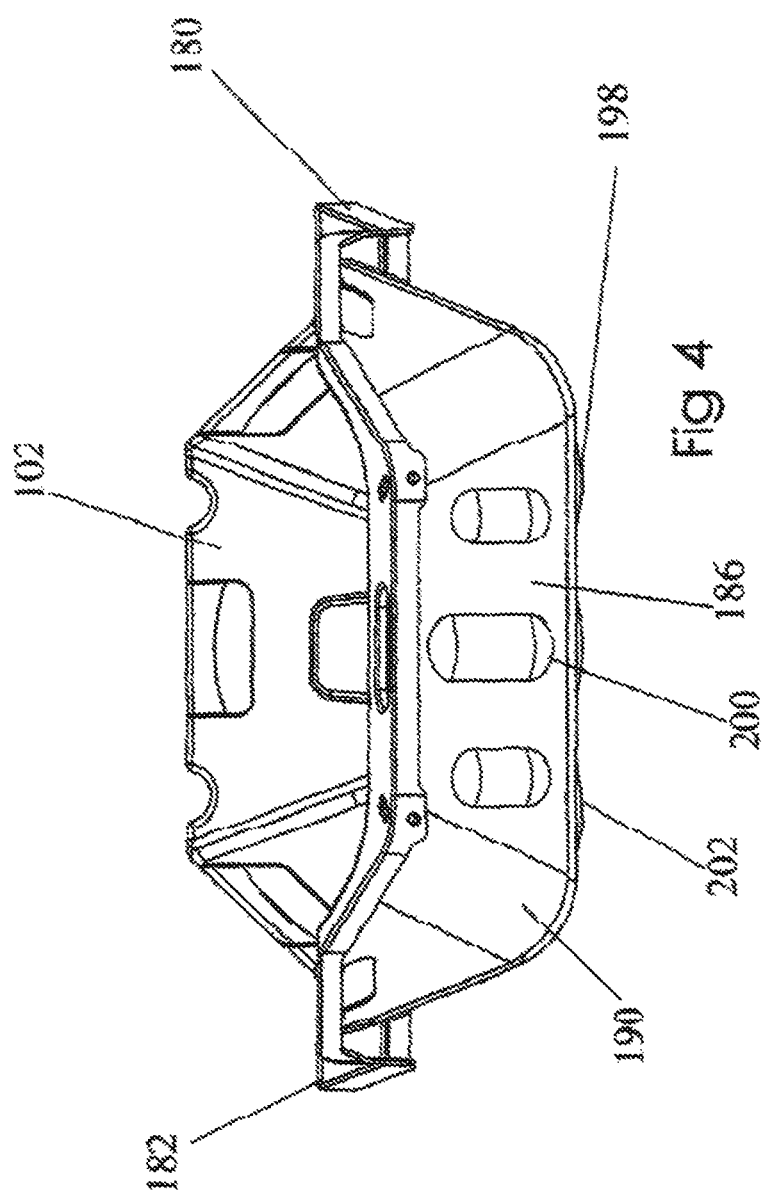
FIG. 4 is a front view thereof.

FIGS. 4-5 show that rear wall 102 extends upward above the front wall 106. Rear wall 102 provides a substantially perpendicular wall extending upward from bed 144. Rear support 188 allows the transport device to serve as a dolly. Rear wall 102 enables the user to position the transport device 100 substantially vertically and place a container, item, tree, etc. on the rear wall 102. The rear wall 102 also allows the carrying device to be stood on its end for storage to reduce the required space.

Rear support 188 provides additional strength to rear wall 102. The rear support 188 assists with using the transport device 100 in the dolly mode. The added strength of rear support 188 helps maintain the shape of the rear wall 102 of the transport device 100. The rear support 188 limits bending and collapsing of the rear wall 102 during use of the transport device 100 as a dolly. The rear support 188 increases the rigidity of the rear wall 102 to allow rear wall to support items during transportation.

Rear guides 110, 112 found on rear wall 102 create a V-shape or U-shape to guide items toward the rear wall 102 and rear support 188. The rear guides 110, 112 also form multiple bends in the rear wall 102. The rear guides 110, 112 strengthen rear wall 102 to help maintain the shape of rear wall 102 when carrying loads. FIG. 5 shows guides 220, 222 that angle towards the storage recesses. Guides 220, 222 direct items towards the storage recesses to maintain the items within the storage recesses.

FIG. 6 shows one embodiment of the present invention. FIG. 6 shows a method of using the transport device 100 as a scoop.

FIGS. 7-19 show another embodiment of the transport device 300 customized for beach use. In one embodiment, transport device 300 has similar rib structure, ribs 422, 426, 430 and towing apertures 418, 420, 424, 428, 432, found in transport device 100 for towing. Transport device 300 of one embodiment also includes vertical supports, horizontal supports, and front supports described above. One embodiment of the transport device 300 also includes side supports described above.

Front wall 302, side curves 312, 336, side walls 326, 334, and rear wall 328 maintain objects, equipment, ice chests, coolers, lawn chairs, towels, beach umbrellas, stereos, tools, and other equipment that a user may need to transport. The items and other equipment may be stored on the bed 340 and front wall 302.

The bed 340 located at the base of the transport device 300 provides an area for transporting items. Side walls 326, 334, front wall 302, rear wall 328, and curved walls 312, 338 extend vertically upward from bed 340 to help maintain the items on the transport device 300. In one embodiment, side walls 326, 334, rear wall 328, and curved walls 312, 338 curve upwards where the walls meet bed 340.

Figure 7:
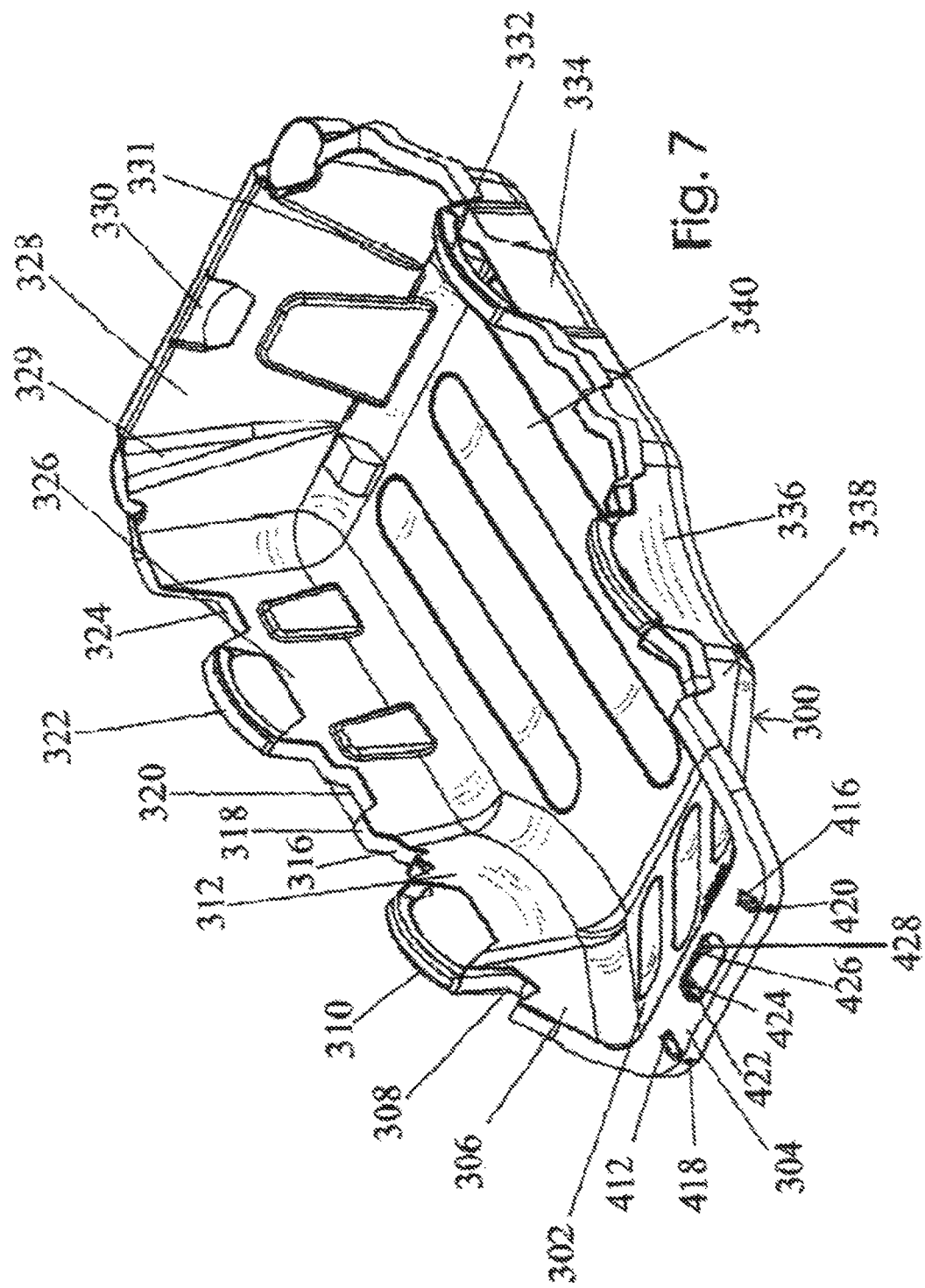
FIG. 7 is a top perspective view of one embodiment of the present invention.

Referring to FIGS. 7 and 8, curved walls 312, 336 connect front side walls 306, 338 with side walls 326, 334. Curved walls 312, 336 curve inwards to provide support and narrow the front of the transport device 300. Curved walls 312, 336 extend inward to the center of the bed 340. Curved walls 312, 336 decrease the distance between the left side and the right side of the transport device 300. The decreased distance allows users to place lawn chairs and other items within storage recesses 308, 309, 316, 317.

Storage recesses 308, 316, 320, 324 on front side wall 306, curved wall 312, and side will 326 correspond with storage recesses 309, 317, 321 325 on front side wall 338, curved wall 336, and side wall 334. Storage recesses 308, 309, 316, 317, 320, 321, 324, 325 provide an elevated area for placement and storage of items and equipment to help maintain such items and equipment on the transport device 300. These storage recesses 308, 309, 316, 317, 320, 321, 324, 325 are sized to accept a two by four for generating a second level carrying or support surface above the bed 340. Users may place items within storage recesses 308, 309, 316, 317, 320, 321, 324, 325 to support such items and equipment above side walls 306, 338, curved walls 312, 336, and side walls 326, 334. The walls also elevate storage recesses 308, 309, 316, 317, 320, 321, 324, 325 above the bed 340 to elevate items above the bed 340 and from wall 302. Such elevated storage increases the storage room of the bed 340.

The storage recesses 308, 309, 316, 317, 320, 321, 324, 325 correspond with each other so that an item can be placed across both the left side and the right side of the transport device 300. Storage recess 308 is aligned or at least substantially aligned with storage recess 309. Storage recess 316 is aligned or at least substantially aligned with storage recess 317. Storage recess 320 is aligned or at least substantially aligned with storage recess 321. Storage recess 324 is aligned or at least substantially aligned with storage recess 325. The alignment or at least substantial alignment enables a user to place an item within the storage recesses that are aligned or at least substantially aligned.

Figure 18:
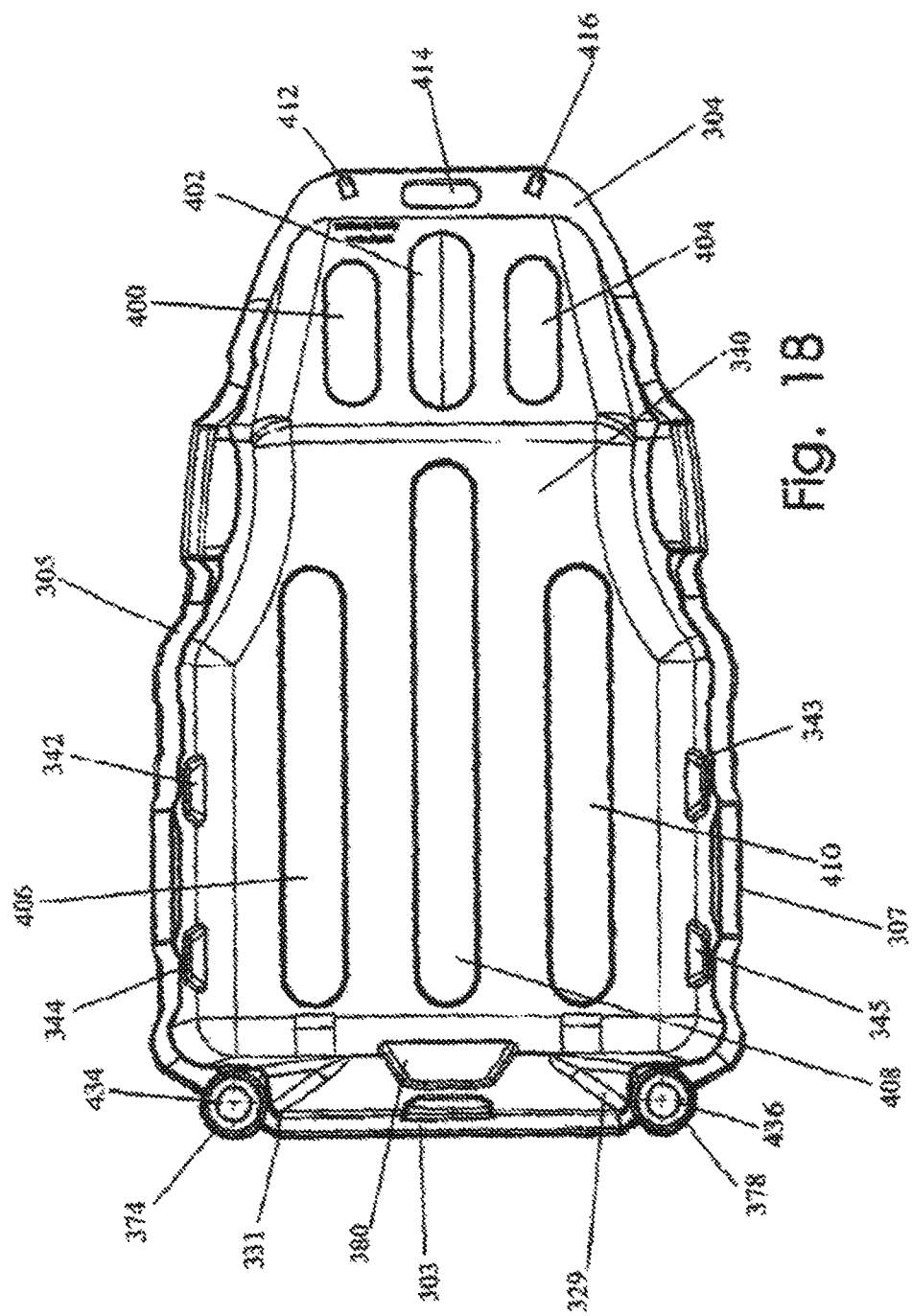
FIG. 18 is a top view thereof.

FIGS. 7 and 18 also show front lip 304, rear lip 303, and side lips 305, 307. Lips 303, 304, 305, 307 provide additional support to the upper portion of the walls. The lips 303, 304, 305, 307 also provide additional surface area for placement of equipment, tools, and other items.

The transport device 300 is designed to carry lawn chairs and other items. To help maintain such items within storage recesses, storage guides 464, 466, 468, 470, 472, 474, 476, 478 located adjacent each storage recess 308, 309, 316, 317, 320, 321, 324, 325 descent towards each storage recess 308, 309, 316, 317, 320, 321, 324, 325. Storage guides 464, 466, 468, 470, 472, 474, 476, 478 direct the items, including but not limited to chairs, items, and other equipment toward storage recesses. Storage guides 464, 466, 468, 470, 472, 474, 476, 478 also provide a surface to lean the items against to minimize movement of the items during transport. In one embodiment, storage guides may be storage slants that slant towards each storage recess.

FIG. 8 also shows handles 310, 322, 332, 346 located along the left side and the right side of the transport device 300. Users may lift the transport device 300 with handles 310, 322, 332, 346. Handles 310, 322, 332, 346 rise above the storage recesses 308, 309, 316, 317, 320, 321, 324, 325 to separate the user's hands from the items placed in storage recesses. The separation created by handles 310, 322, 332, 346 helps protect the user's hands from the items.

Partitions 318, 319 and handles 310, 322, 332, 346 extend above storage recesses 308, 309, 316, 317, 320, 321, 324, 325 to direct items towards the storage recesses. Storage guides 464, 466, 468, 470, 472, 474, 476, 478, partitions 318, 319, and handles 310 322, 332, 346 provide surface area tor leaning items against to assist with maintaining items within the storage recesses and to limit movement of the items within the storage recesses. Partitions 318, 319 also provide flat areas for use as a work station or work table. These flat areas may also be used for placement of accessory parts of the transport device 300.

Vertical supports 342, 343, 344, 345 strengthen side walls 326, 334. Vertical supports 342, 343, 344, 345 extend outward from the exterior of side walls 326, 334 and inward from the interior of side walls 326, 334. The vertical supports provide additional material at the walls to strengthen side walls 326, 334 to support items at storage recesses 316, 317, 320, 321, 324, 325. The supports are constructed from a stronger material, such as a harder or more solid plastic or other rigid substance that increases the strength of the transport device 300.

FIGS. 9-12 show one embodiment of the present invention that provides wheels 350, 352 attached at the base 354 of the transport device 300. The wheels 350, 352 may have different sizes according to the user's needs. In the preferred embodiment shown, the wheels 350, 352 are horizontally positioned so that they stick out past the back wall 102 and vertically positioned so that the edge of the wheel 350, 352 aligns with the bottom of the ribs 349, 351, 360, 362, 364, 366, 368, 369, 371, 372 so that the transport device can be used as a sled by dragging using the ribs, or alternatively, the front wall 106 a the transport device can be rotated upward so that the wheels engage the ground to roll the transport device 100. In this manner, these wheels 350, 352 can assist the user with rolling the transport device 300 without interfering with its ability to be used as a drag sled. This is important for crossing wet or muddy ground where the wheels would dig into the ground, the ribs would increase the ground contact area enough so that the sled could be dragged. This is also very important in a melting ice or snow condition with solid sections of ground interspaced with melting conditions of slush. In one embodiment, front wheels 352 are also included that are smaller in size than rear wheels 350. The larger wheels 350 enable the user to lift the front end of the transport device 300 and use the transport device 300 as a dolly.

FIGS. 12-16 provide more detailed information of the wheels 350, 370. Wheel 350 is attached to base 354 at axle 356. The wheel is placed inside of wheel aperture 358 that allows rotation of the wheels. The user may grab handle 414 to lift the front of the transport device 300 and roll the transport device on wheels 350, 370. As shown in FIG. 15, wheels 350, 370 are spaced across the rear of the transport device. In one embodiment, the wheels 350 are spaced approximately ¼ and ¾ across the rear of the transport device 300.

Transport device 300 provides ribbing 349, 351, 360, 362, 364, 366, 368, 369, 371, 372 as shown in FIGS. 15, 16, 17, and 19. The ribbing located along the base 354 assists with dragging the transport device 300. Ribbing 360, 372 are located along the outer portion of the transport device 300. Ribbing 349, 351 are located approximately in line with wheel 350 so that when dragged, the wheel 350 does not interfere with the ribbing 349, 351 support. This alignment is both horizontally along the axis of the ribbing 349, 351 and vertically with the bottom support edge of the wheel 350 aligned with the bottom edge of the ribbing 349, 351. Similarly, ribbing 369, 371, are located approximately in line with wheel 370. Ribbing 362, 368 are more centrally located than ribbing 360, 372; and ribbing 364, 366 are approximately centrally located. The ribbing is constructed from a solid plastic that provides a harder surface to contact the ground when dragging the transport device. The ribbing 360, 362, 364, 366, 368, 372 increases the life of the transport device by providing a more rugged surface for dragging the transport device and increases the ground surface area when encountering soft or wet ground such as sand or mud.

Rear support 348, similar to vertical supports 342, 343, 344, 345 provides additional strength to rear wall 328. The rear support 348 assists with using the transport device 300 in the dolly mode. The added strength of rear support 348 helps maintain the shape of the rear wall 328 of the transport device 300. The rear support 348 limits bending and collapsing of the rear wall 328 during use of the transport device 300 as a dolly. The rear support 348 increases the rigidity of the rear wall 328 to allow rear wall to support items during transportation. Note that the rear wall 328 can also be designed to be perpendicular to the bottom or bed 340. When the rear wall 328 is perpendicular to the bed 340, the sled dolly 100 can vertically stand on the rear wall 325 so that the bed 340 is vertically perpendicular to the ground. This allows for a perpendicular dolly 100 type of construction.

Figure 17:
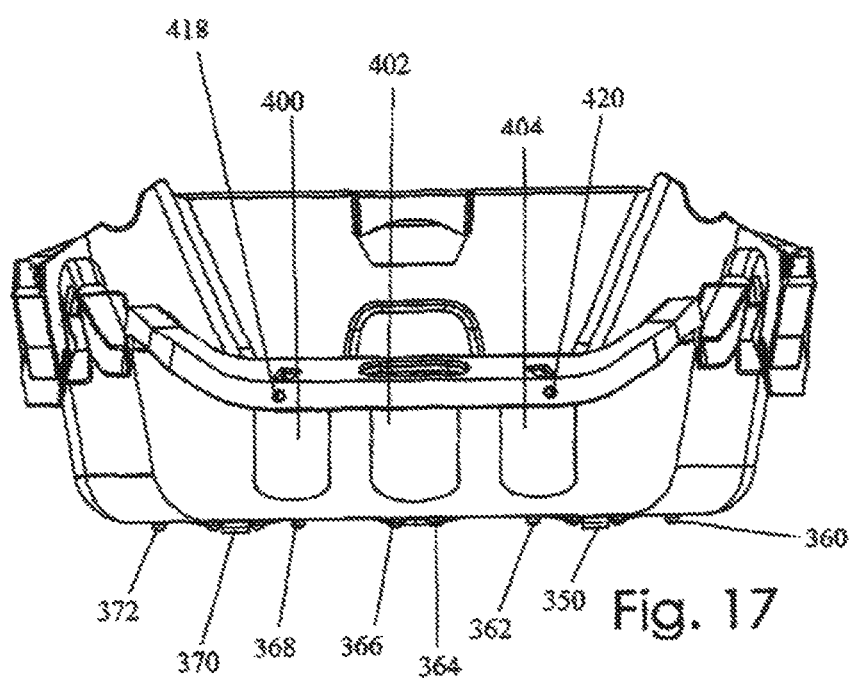
FIG. 17 is a front view of one embodiment of the present invention.
Figure 21:
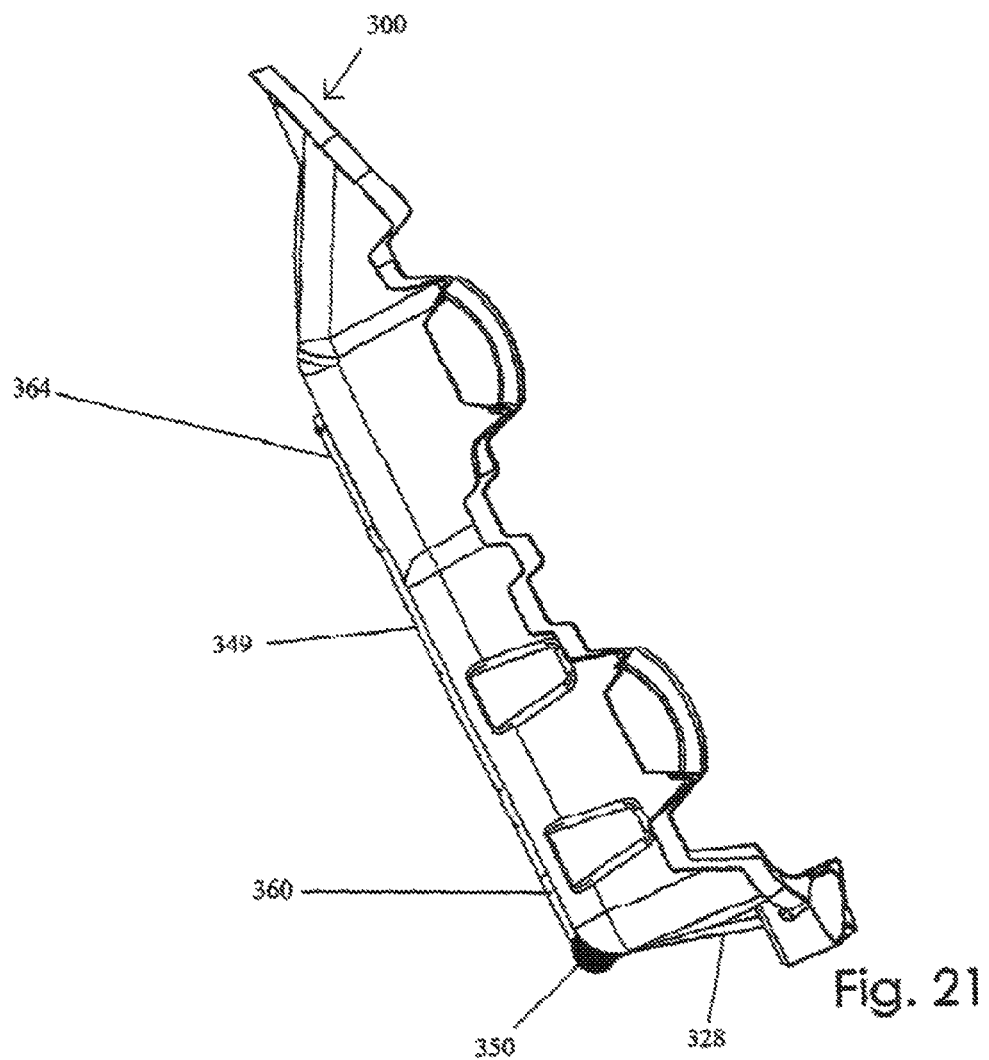
FIG. 21 is an environmental view thereof.

Referring to FIG. 17, rear wall 328 rises higher than front wall 302 to allow storage of items such as beach umbrellas across front wall 302 or within the bed 340. Rear support 348 provides a substantially perpendicular wall extending upward from bed 340. Rear wall 328 allows the transport device to serve as a dolly as shown in FIG. 21. Rear wall 328 enables the user to position the transport device 300 substantially vertically and place a container, item, cooler, etc. on the rear wall 328. The rear wall 328 also allows the carrying device 300 to be stood on its end for storage to reduce the required space. The rear wall 328 can also include the rear support 348 described above.

Rear guides 329, 331 found on rear wall 330 create a V-shape or U-shape to guide items toward the rear wall 330 and rear support 348. The rear guides 329, 331 also form multiple bends in the rear wall 330. The rear guides 329, 331 strengthen rear wall 330 to help maintain the shape of rear wall 330 when carrying loads.

The user can lift or drag the transport device 300 by using front handle aperture 414. The user can also use a rope, webbing, cord, line, chain, or other device or material that can tow the transport device 300. The webbing installs onto the transport device 300 at towing recesses 412, 416. In one embodiment, the webbing may be tied at towing recesses 152, 154 to install the webbing. Ribs 422, 426, 430 provide additional support to the front of the transport device 300. The webbing may pass through tow apertures 474, 428 found in ribs 422, 426, 430. The webbing also passes through towing apertures 418, 420 of front lip 304. The user can then tow the front of the transport device while applying even pressure to the front of the transport device 300.

Bottom supports 406, 408, 410 provide additional support to the bottom of the transport device 300. The bottom supports strengthen the bed 340 to allow users to lift items with the bed 340 and to tow items along the bed 340. Similarly, front supports 400, 402, 404 strengthen the front wall 304 to allow users to use the handle 414 for lifting items with the front wall 304. Furthermore, from supports 400, 402, 404 also allow users to tow items by applying pressure at the front of the transport device 300.

Similar to the supports described above, bottom supports 406, 408, 410 and front supports 400, 402, 404 provide additional rigid material at the supports. The additional material at supports 342, 344, 400, 402, 404, 406, 408, 410 adds strength to the transport device to maintain the shape of the transport device 300. The supports 342, 344, 400, 402, 404, 406, 408, 410 prevent the transport device from bending and collapsing due to the forces applied to the transport device 300.

Bottom supports 406, 408, 410 and front supports 400, 402, 404 extend downward similar to the bottom supports and front supports described above for transport device 100. The downward curvature of supports 402, 404, 406, 408, 410 also improves a user's access to the contents within transport device 300. By not extending upwards, supports 402, 404, 406, 408, 410 do not interfere with a user shoveling or otherwise emptying contents from the bed.

Continuing to refer to FIG. 18, storage receptacles 374, 378 provide additional storage on the transport device 300. Storage receptacles 374, 378 of one embodiment are sized to accept items such as a beverage container. These storage receptacles 374, 378 have a side wall and a bottom wall and the bottom wall includes an anchor aperture 434, 436. The anchor aperture 434, 436 is centrally located and smaller than the bottom wall so that the bottom wall can still support the beverage container around the edges. Anchor apertures 434, 436 located within storage receptacles 374, 378 allow placement of a pole, stake, umbrella, or other anchoring device through the anchor apertures 434, 436. The anchor apertures 434, 436 extend through the transport device 300. The user places a pole, stake, umbrella, or other anchoring device through the anchor apertures 434, 436 to stake the transport device 300 to the ground. Staking the transport device 300 prevents the transport device from blowing away or other unintentional movement. Anchor apertures 434, 436 may also be used for hanging the transport device 300 on a wall for storage. A hook or other hanging material can be inserted into the anchor aperture 434, 436 for lifting the transport device 300.

Figure 19:
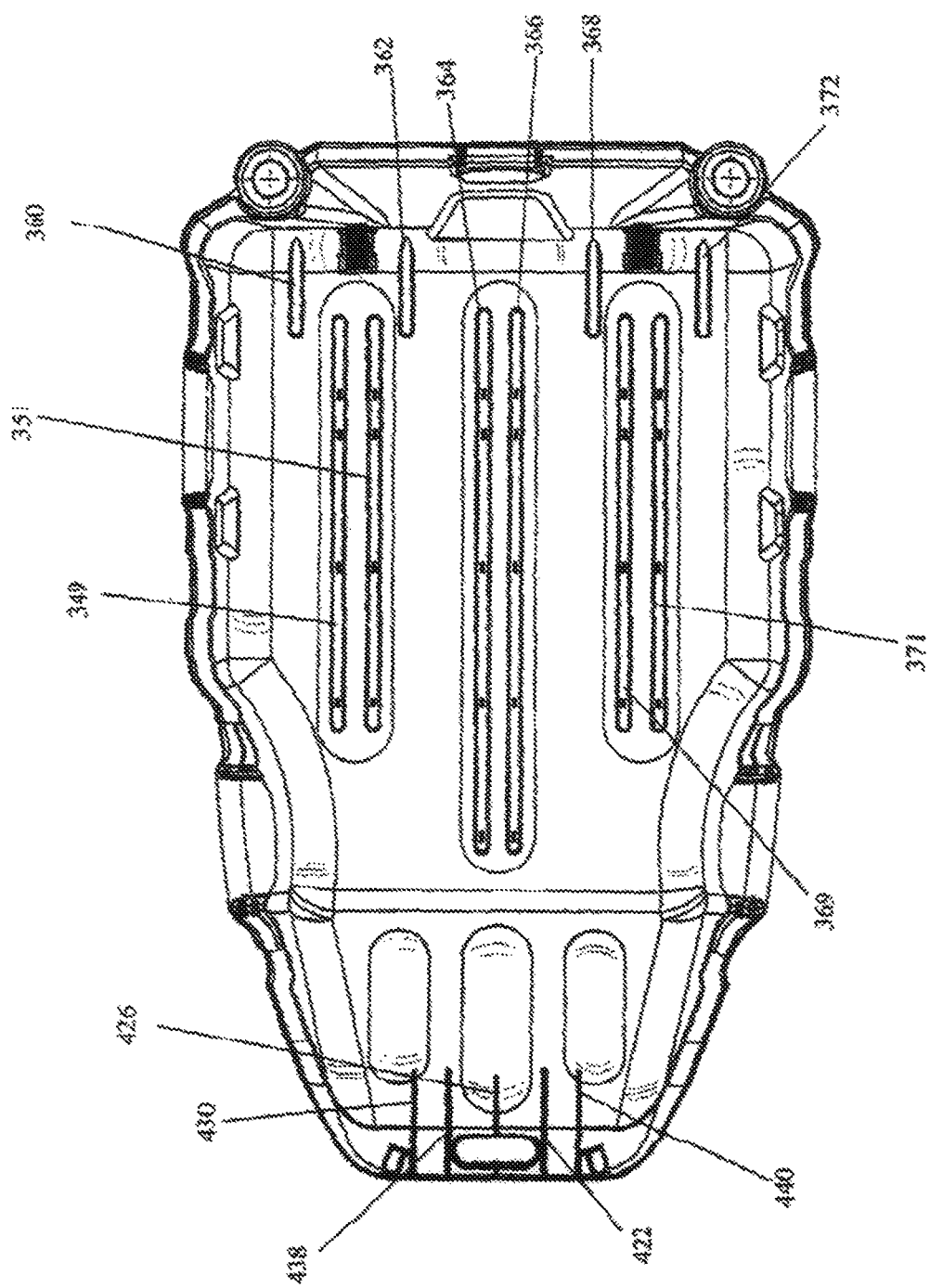
FIG. 19 is a bottom view thereof.

FIG. 19 shows a bottom view of the transport device 300. The user can insert a webbing, rope, rope, webbing, cord, line, chain, or other device or material through towing apertures 424, 428, 432 through ribs 422, 426, 430, 438, 440. The webbing inserted through the ribs 422, 426, 430, 438, 440 allows the user to tow the transport device 300. Ribs 422, 426, 430, 438, 440 provide additional support to the front of the transport device 300. One embodiment of the transport device places towing apertures within ribs 422, 426, 430, 438, 440 as described above to allow the user to evenly apply force across the front of the transport device 300.

Ribbing 349, 351, 360, 362, 364, 366, 368, 369, 371, 372 located on base 354 provides additional strength to the base 354. The added strength of the ribbing 349, 351, 360, 362, 364, 366, 368, 369, 371, 372 enables the user to drag the transport device 300 across hard surfaces. The ribbing 349, 351, 360, 362, 364, 366, 368, 369, 371, 372 also increases the strength of the base to limit breaking or other tearing of the base 354.

Figure 20:
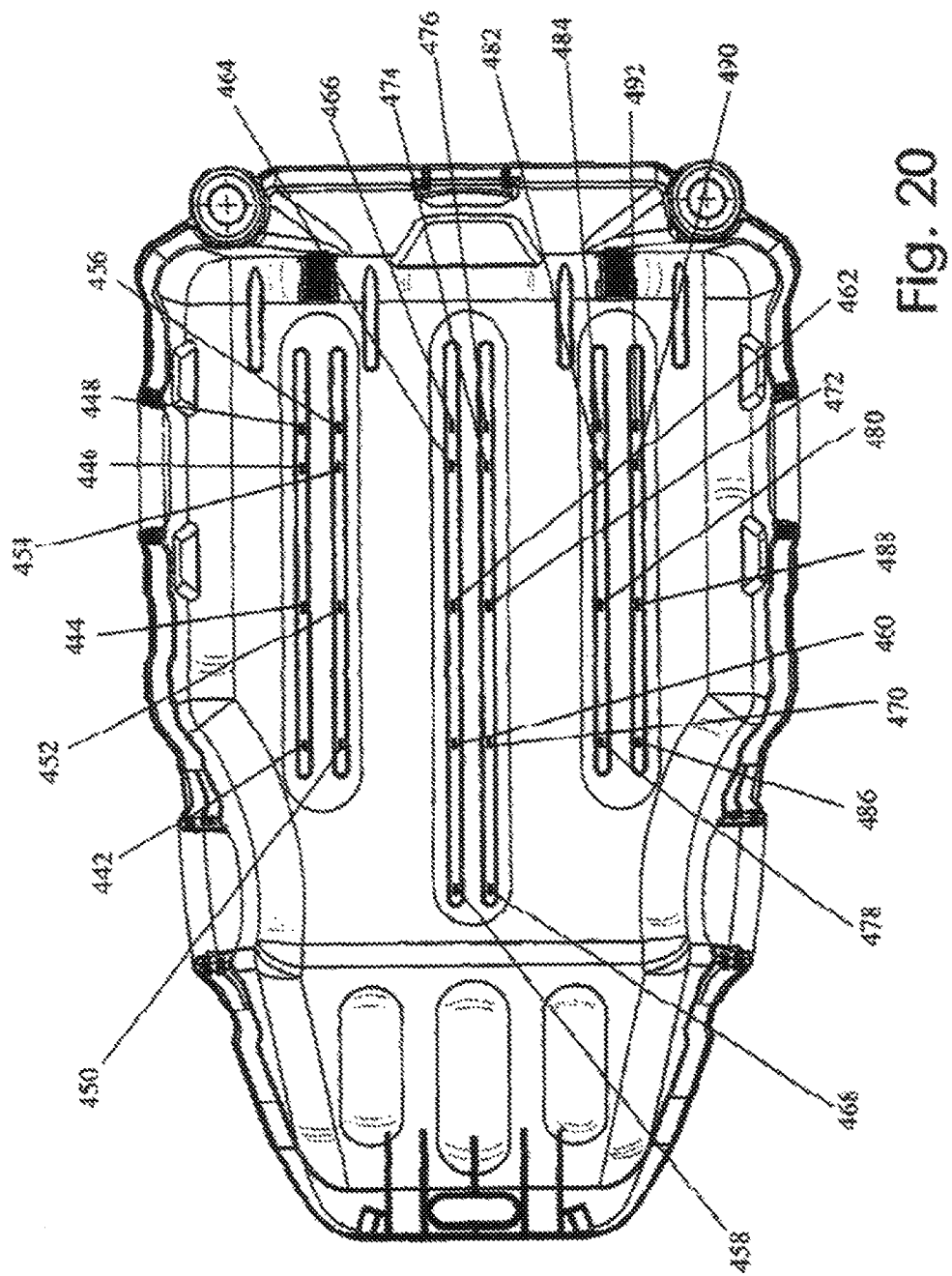
FIG. 20 is a bottom view thereof.

Referring to FIG. 20, the transport body of one embodiment provides multiple wheels located in linear fashion along the base 354. Multiple wheels are located linearly or at least approximately linearly across the length of the base 354. The wheels of one embodiment are located along ribbing 349, 351, 360, 362, 364, 366, 368, 369, 371, 372. In one embodiment, the wheels are mounted on the ribbing.

Wheels 442, 444, 446, 448 are mounted linearly across ribbing 349. Wheels 450, 452, 454, 456 are mounted linearly across ribbing 351. Wheels 458, 460, 462, 464, 466 are mounted linearly across ribbing 364. Wheels 468, 470, 472, 474, 476 are mounted linearly across ribbing 366. Wheels 478, 480, 482, 484 are mounted linearly across ribbing 369. Wheels 486, 488, 490, 492 are mounted linearly across ribbing 371.

In one embodiment, the wheels are also located in a linear fashion across the width of the transport device 300. For example, wheels 458, 468 are located in linear fashion across the width of the base 354. Wheels 442, 450, 460, 470, 478, 486 are located in linear fashion across the width of the base 354. Wheels 444, 452, 462, 472, 480, 488 are located in linear fashion across the width of the base 354. Wheels 446, 454, 464, 474, 482, 490 are located in linear fashion across the width of the base 354. Wheels 448, 456, 464, 476, 484, 492 are located in linear fashion across the width of the base 354.

The length of one embodiment of the transport device 300 from front to back ranges from 38 to 54 inches, preferably approximately 45 to 48 inches. The width of one embodiment ranges from 22 to 34 inches, preferably approximately 26 to 30 inches. The lips of the invention can range from one quarter of an inch to one inch.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A sled dolly apparatus for transporting an item on a bed or a wall wherein the apparatus is configured to be carried or towed by a webbing, the apparatus comprising:
    a bed;
    a rear wall extending vertically upward from the rear of the bed;
    a first side wall extending vertically upward from the bed;
    a second side wall extending vertically upward from the bed;
    a front wall extending vertically upward from the bed wherein the front wall slants vertically upward away from the bed;
    a first storage recess located on the first side wall wherein the first storage recess is located below the top of the first side wall;
    a first side handle located on the first side wall above the front wall and in front of the first storage recess, the first side handle including a handle aperture;
    a least one ground contact ribbing located on the underside of the bed, the ribbing having a length and increasing the strength of the underside of the bed; and
    at least one wheel attached at the back wall and both behind and in line with the length of the at least one ground contact ribbing.

2. A sled dolly apparatus for transporting an item on a bed or a wall wherein the apparatus is configured to be carried or towed by a webbing, the apparatus comprising:
    a bed including at least one lower ground contact drag rib with a length;
    a rear wall extending vertically upward from the rear of the bed;
    a first side wall extending vertically upward from the bed;
    a second side wall extending vertically upward from the bed;
    a first wheel aperture positioned where the rear wall joins the bed between the first side wall and the second side wall, the wheel aperture positioned in line with and behind the length of the at least one lower ground contact drag rib;
    a front wall extending vertically upward from the bed wherein the front wall slants vertically upward away from the bed; and
    a rear support located on the rear wall to provide additional support to the rear wall wherein the rear support increases the strength of the wall to enable the rear wall to serve as a dolly; and
    a first wheel mounted within the aperture, the wheel aligned with the length of the at least one lower ground contact drag rib.

3. The apparatus of claim 2 further comprising:
    the bed including a second lower ground contact drag rib;
    a second wheel aperture positioned where the rear wall joins the bed between the first side wall and the second side wall, the second wheel aperture positioned in line with the length of the second lower ground contact drag rib; and
    a second wheel mounted within the second wheel aperture, the wheel aligned with the length of the second lower ground contact drag rib.

4. The apparatus of claim 2 further comprising:
    a handle located proximate to the front of the front wall.

* * * * *